W. H. TORIAN.
FASTENING DEVICE.
APPLICATION FILED MAY 31, 1912.
1,071,190.
Patented Aug. 26, 1913.
2 SHEETS—SHEET 2.
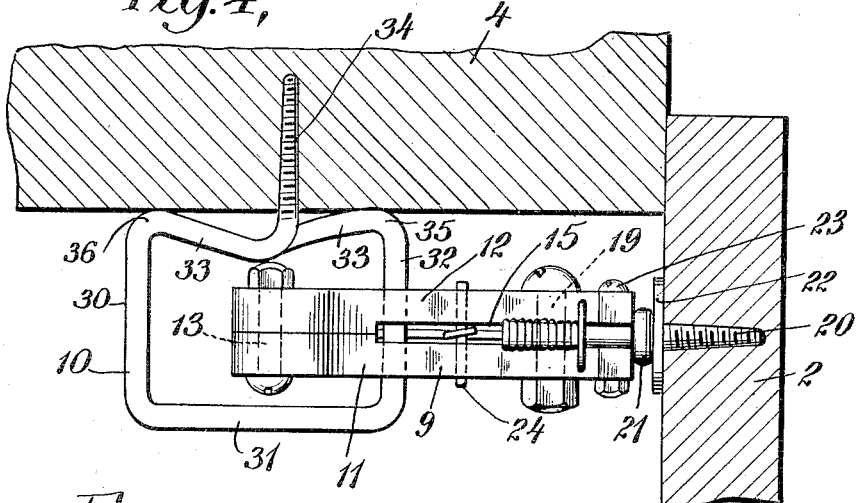
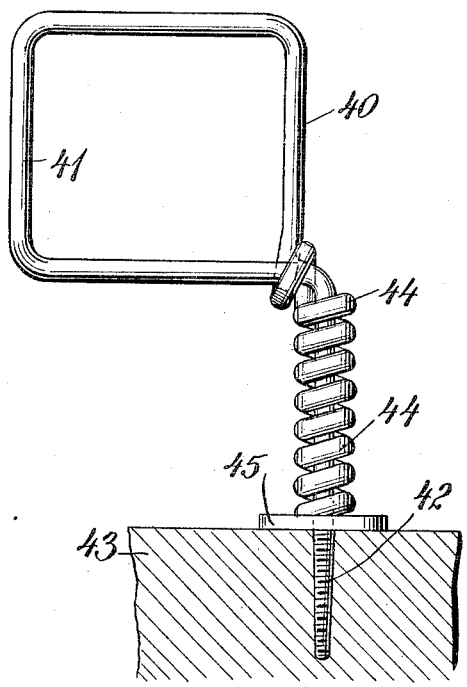
WITNESSES
John O. Gempler
Gustav Harris
INVENTOR
William H. Torian
BY
Kenyon & Kenyon
ATTORNEY

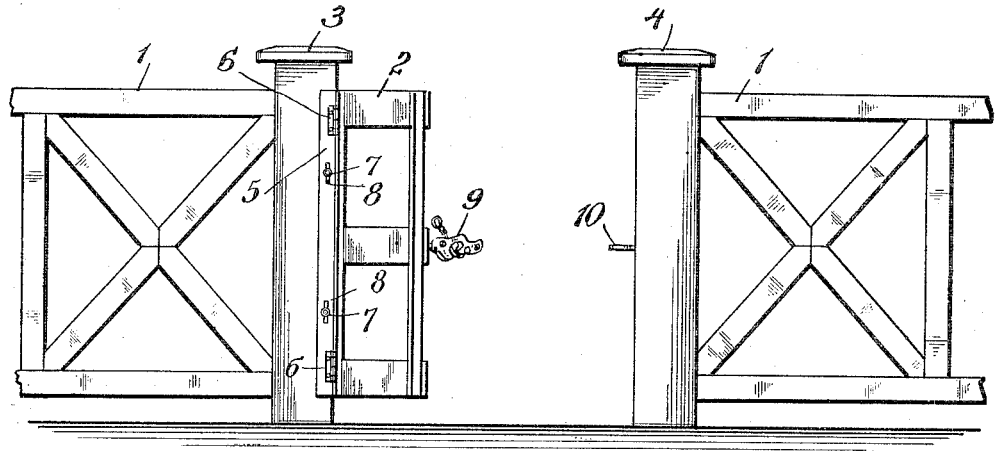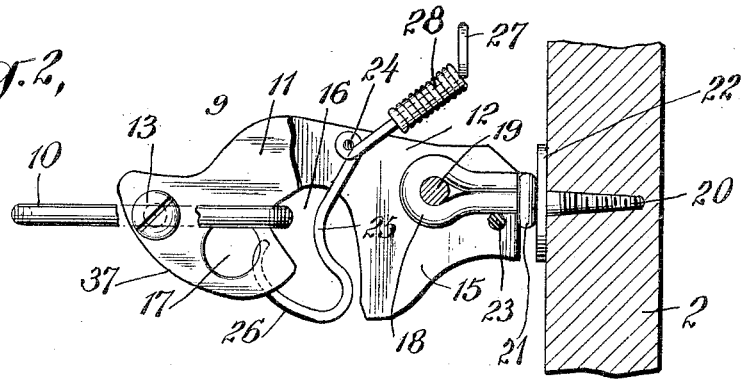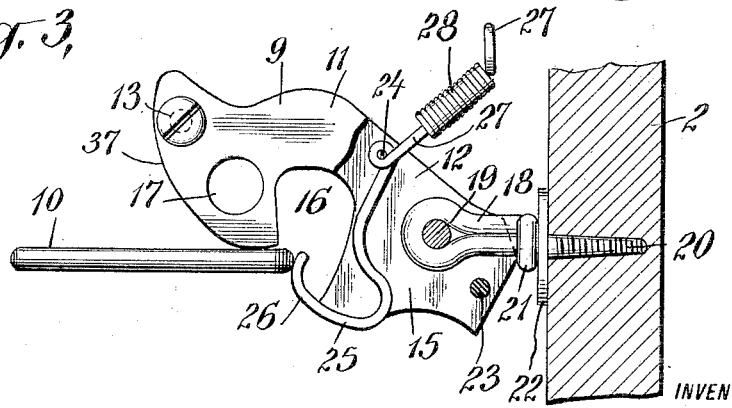

UNITED STATES PATENT OFFICE.

WILLIAM H. TORIAN, OF WACO, TEXAS.

FASTENING DEVICE.

1,071,190.

Specification of Letters Patent.

Patented Aug. 26, 1913.

Application filed May 31, 1912. Serial No. 700,622.

*To all whom it may concern:*

Be it known that I, WILLIAM H. TORIAN, a citizen of the United States, and a resident of Waco, McLennan county, Texas, have invented certain new and useful Improvements in Fastening Devices, of which the following is a specification.

My invention relates to improvements in fastening devices and more particularly to latches and coöperating strikes such as used in fastening gates, etc.

One object of my invention is to provide a strike for such latching means which is easily and quickly put in place, which is easily adjustable to different heights of the latching member, which is easily and quickly adjustable to different horizontal positions of the latching member, and which is so constructed that it is firmly but simply held in place in any of its positions.

Further objects, features and advantages will more clearly appear from the detailed description given below taken in connection with the accompanying drawings which form a part of this specification.

In the drawings, Figure 1 is a side view illustrating a gate having one form of my improved fastening means for securing the same to the gate post. Fig. 2 is a detailed side view of the fastening means embracing the latch member and strike, certain parts being broken away in order to more clearly illustrate the same. Fig. 3 is a similar view showing the latch member about to engage the strike. Fig. 4 is a plan view of the parts shown in Figs. 2 and 3. Fig. 5 is a plan view of the modified form of strike. Fig. 6 is a side view of a still further modified form of strike device. Fig. 7 is a plan view of the device shown in Fig. 6.

Referring to Figs. 1 to 4 inclusive, 1 represents a fence and 2 a gate between the posts 3 and 4. The gate 2 is secured to a member 5 by means of hinges 6. The member 5 is adjustably secured to the post 3 by means of screws 7 passing through slots 8. Thus the height of the gate may be quickly and easily adjusted by slightly withdrawing the screws 7 and moving the gate 2 up or down as desired, and then tightening the screws 7 to again firmly secure the gate in its adjusted position.

At the opposite end of the gate it is provided with an improved latch member 9 which engages and coöperates with a strike 10 secured to the post 4. The latch member 9 comprises two parts 11 and 12, secured together at one end by the bolt 13 and having cut away portions so as to form a vertical slot at 15. The member 9 is provided with a strike engaging recess at 16, for engaging the strike 10. It is also provided with an aperture 17 therethrough, through which the shackle of a padlock or similar device may be passed for absolutely locking the gate. If the padlock is small enough to pass through the strike the shackle of the padlock may be passed not only through the aperture 17, but also around one member of the strike 10.

The latch member 9 is secured to the gate 2 by means of a screw-eye 18 which extends into the slot 15, and through the eye of which passes a pivot pin 19 so that the member 9 is pivoted on the screw-eye 18. The screw-eye is preferably formed of heavy wire, one end of which is turned about the screw shank 20 as at 21, in order to form a shoulder for abutting against the gate or material to which the latch member is secured. If it is desired to increase the bearing of this shoulder a washer 22 may be interposed between the shoulder at 21 and the wood of the gate. A pin 23 passes across the slot 15 between the two members 11 and 12 and engages the underneath side of the screw-eye 18 to act as a stop, and limit the downward movement of the latch 9 about its pivot 19. Pivotally mounted in the slot 15 on a pivot pin 24 is a gravity operated locking member 25 having a hook portion 26 adapted to pass across the recess 16 in order to lock the strike 10 therein. The member 25 is provided with a projecting handle 27 extending upwardly, and preferably the whole locking member is formed of wire, one end of which is coiled around the handle 27 at 28, in order to weight the handle and cause the hook portion 26 to tend to always move by gravity across the opening of the recess 16.

The strike 10 is preferably formed of heavy wire and comprises four sides, 30, 31, 32 and 33, with a screw shank 34 projecting from the side 33. The sides 30 and 32 are substantially parallel with one another and are each adapted to be engaged by the latch member 9. The screw shank 34 also projects from the side 33, parallel to the sides 30 and 32, but at unequal distances from the sides 30 and 32. The side 33 is bent inwardly from the sides 30 and 32 toward the inner end of the screw shank 34, thus providing two abutments at 35 and 36, which engage the wood or material to which the strike is attached with a spring pressure, and are adapted to bite into the wood or other material to more firmly hold the strike in place.

In operation, when the gate is being shut the underneath cam face 37 of the latch 9 engages the side 32 of the strike 10 so that the latch member is somewhat oscillated about the pivot pin 19 and rides up over the side 32 of the strike. As the side 32 nears the recess 16 the side 32 strikes the hook member 26 forcing it backwardly against the action of gravity until finally the side 32 of the strike slips into the recess 16, the latch member falling downwardly by gravity, and the hook 26 passing under the side 32 of the strike. Gravity causes the hook 26 to pass completely across the recess 16, as shown in Fig. 2, in order to lock the latch member to the strike. In order to open the gate it will be seen that two movements are necessary. First, the handle 27 must be seized and thrown to the left, as shown in Figs. 2 and 3, and then it should be pulled upwardly in order to remove the latch member 9 from the strike 10.

If it is found that the gate is either too high or too low, so that the latch member with its recess 16 does not properly coöperate with the engaging side of the strike 10, then the strike 10 may be turned slightly about the screw shank 34 as an axis, until the side 32 is brought high enough or low enough to properly engage the recess 16. If it is found that the strike 9 will not move inwardly far enough so that its recess 16 will slip over the side 32, then the strike 10 may be given a one-half revolution about the shank 34 as an axis, whereupon the engaging side 30 will be brought into operative position, and since the side 30 is farther away from the axis than the side 32 it will be brought nearer to the gate member so that it will properly slip into the recess 16. Since the points or portions 35 and 36 engage the post with a spring pressure this slight rotation which of course draws the screw shank farther into the wood or moves it a slight distance outward, does not materially loosen the strike, as because of this spring pressure these portions will always firmly engage the material to which the strike is attached.

The modified form of strike shown in Fig. 5 is provided with two portions 40 and 41, adapted to engage with the latch member. As will be seen from Fig. 5, this form of strike is made of heavy wire bent rectangular in shape, one end of the wire being in the form of a screw shank 42, extending into the material 43, to which the strike is attached. The other end of the wire is coiled about the inner portion of the screw shank 42, as at 44, to form a coil spring which bears against the washer 45 with a spring pressure, so that a portion of the strike bears against the means to which it is attached with the spring pressure. If desired, the washer 45 may be omitted, but in either case, if the strike is turned a part of a revolution or so, in order to adjust the parts 40 or 41 to properly engage the latch member, nevertheless this does not materially loosen the strike, as the spring 44 or washer 45 always binds tightly against the material 43 to which the strike is attached. It will also be noted that the portions 40 or 41 which are engaged by the latch member are at unequal distances from the axis of the screw shank 42, so that either one or the other of these portions 40 or 41 may be used for engagement with the latch member, according to the condition encountered.

By attaching the latch member 9 to the gate or other part, by means of a screw-eye, the same may be quickly inserted in place and easily removed and put in a new position, as desired. The screw-eye not only serves as a means for securing the latch member in place, but also, coöperating with the pin 23, serves as a stop for limiting the downward movement of the latch member.

Although I have described my improvements in great detail and with respect to particular embodiments thereof, I do not desire to be limited to such details except as clearly specified in the appended claims, since many changes and modifications may well be made without departing from the spirit and scope of my invention in its broader aspects.

Having fully and clearly described my improvements, what I claim as new and desire to secure by Letters Patent, is:

1. A strike for latches and the like, comprising a four sided member, having a screw shank projecting from one side at unequal distances from the two adjacent sides, and said first mentioned side having portions which engage the means to which the strike is secured with a spring pressure.

2. A strike for latches and the like, comprising a device having two opposite sides each adapted to be engaged by a latch, means for securing the strike in place and portions engaging the material to which the strike is secured with a spring pressure.

3. A strike for latches and the like, comprising a four sided member two of which sides are parallel and adapted to be engaged by a latch or the like, and means extending from the member into the material to which the strike is secured at unequal distances from said sides and about which the strike may be turned as an axis, whereby the strike may be adjusted for different latch positions by turning the same about said means as an axis, said member having means engaging the material to which the strike is secured with a spring pressure.

4. A strike for latches and the like, comprising a device having two opposite sides each adapted to be engaged by a latch, means for securing the same in place, and means engaging the material to which the strike is secured with a spring pressure.

In testimony whereof, I have signed my name to this specification, in the presence of two subscribing witnesses.

WILLIAM H. TORIAN.

Witnesses:
   Louis Kellner,
   Gus Rosenthal.

Copies of this patent may be obtained for five cents each, by addressing the "Commissioner of Patents, Washington, D. C."